M. EARLY.
ANIMAL TRAP.
No. 189,346. Patented April 10, 1877.
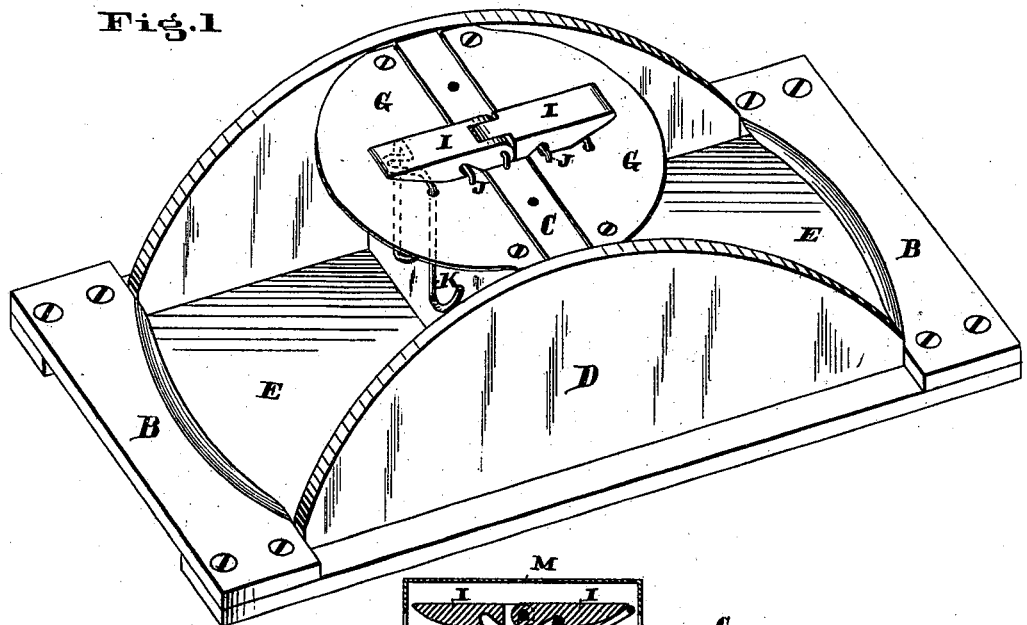
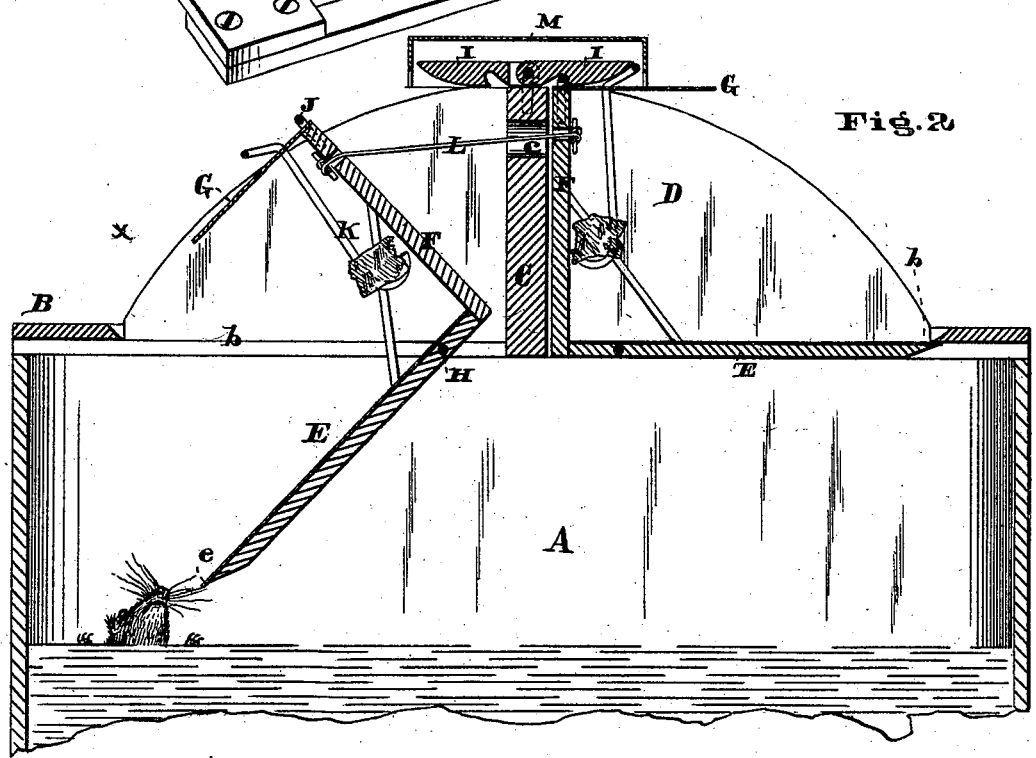
Attest
Chas. F. Gessert
Harry E. Knight
Inventor:
M. Early
By Knight Bros. Atty's

UNITED STATES PATENT OFFICE.

MATTHIAS EARLY, OF NEW MADISON, OHIO.

IMPROVEMENT IN ANIMAL-TRAPS.

Specification forming part of Letters Patent No. 189,346, dated April 10, 1877; application filed March 9, 1877.

*To all whom it may concern:*

Be it known that I, MATTHIAS EARLY, of New Madison, Darke county, Ohio, have invented a new and useful Animal-Trap, of which the following is a specification:

My invention relates to an improved form of those animal-traps which precipitate the victim into a tank; and comprises an arrangement of two pitfalls, so connected by a suitable cord or thong as for each in succession to set the other, thus keeping the trap in constant efficiency, while at the same time permitting so brief an occupancy of the platform by the animal as to afford no opportunity to acquire the odor which soon renders the ordinary trap useless.

In the accompanying drawings, Figure 1 is a perspective view of a trap embodying my invention, both platforms being shown set. Fig. 2 is a vertical section of the same, to a somewhat larger scale, one of the platforms being shown sprung or dumped.

A may represent any suitable tank or vessel for containing water. B represents a rectangular frame, having two openings, b, separated by a partition, C, and flanked by two barriers, D. In the fully-set condition of the trap each opening b is closed by its proper pitfall or dumping-platform, of which each consists of a floor, E, a back, F, and a canopy, G, all united rigidly in a single piece, which is swung within the frame B by pivots H, considerably to the rear of the center of gravity of the platform. This location of the pivots causes the platform, whenever at liberty, to drop to the position shown at x in Fig. 2.

Each platform is held to its set position by gravitating hook or catch I engaging over a projection, J, from the canopy, and is liberated by the victim drawing on the bait-hook K, which leaves the platform at liberty to descend to the position x, and in so doing to precipitate him into the tank, as indicated in Fig. 2.

The partition C has, near its upper edge, an orifice, c, for the traverse of a cord or thong, L, which, connecting the two platforms in the manner shown, enables either to limit the drop of the other, and subsequently, when itself descending with a victim, to restore that other to the set position, the weight of the captive giving each platform in turn the power of elevating the other.

The floor E of each platform has, preferably, a metallic sheathing, e, in order to render it slippery, and thus to prevent the escape of the animal. The barriers D also add to the difficulty of escape.

The catches I may be protected by a sheath, M.

I claim as new and of my invention—

1. An animal-trap having two similar pitfalls, consisting of the parts E, F, and G, in combination with the open frame B and partition C, whose orifice c is traversed by cord or thong L, connecting the two platforms, and with suitable bait and set hooks K I, as and for the purpose set forth.

2. The barriers D, in combination with the pitfalls, consisting of parts E, F, and G, adapted to reset each other, as and for the purpose set forth.

3. A dumping-platform or pitfall, composed of floor E, rear wall F, and canopy G, from which the bait-hook K is suspended, and with which the catch I engages, in the manner shown.

In testimony of which invention I hereunto set my hand.

MATTHIAS EARLY.

Attest:
 GEO. H. KNIGHT,
 JOHN I. MILLOWAY.